(No Model.)
W. J. TRIPP.
JOURNAL BEARING.
No. 575,386. Patented Jan. 19, 1897.
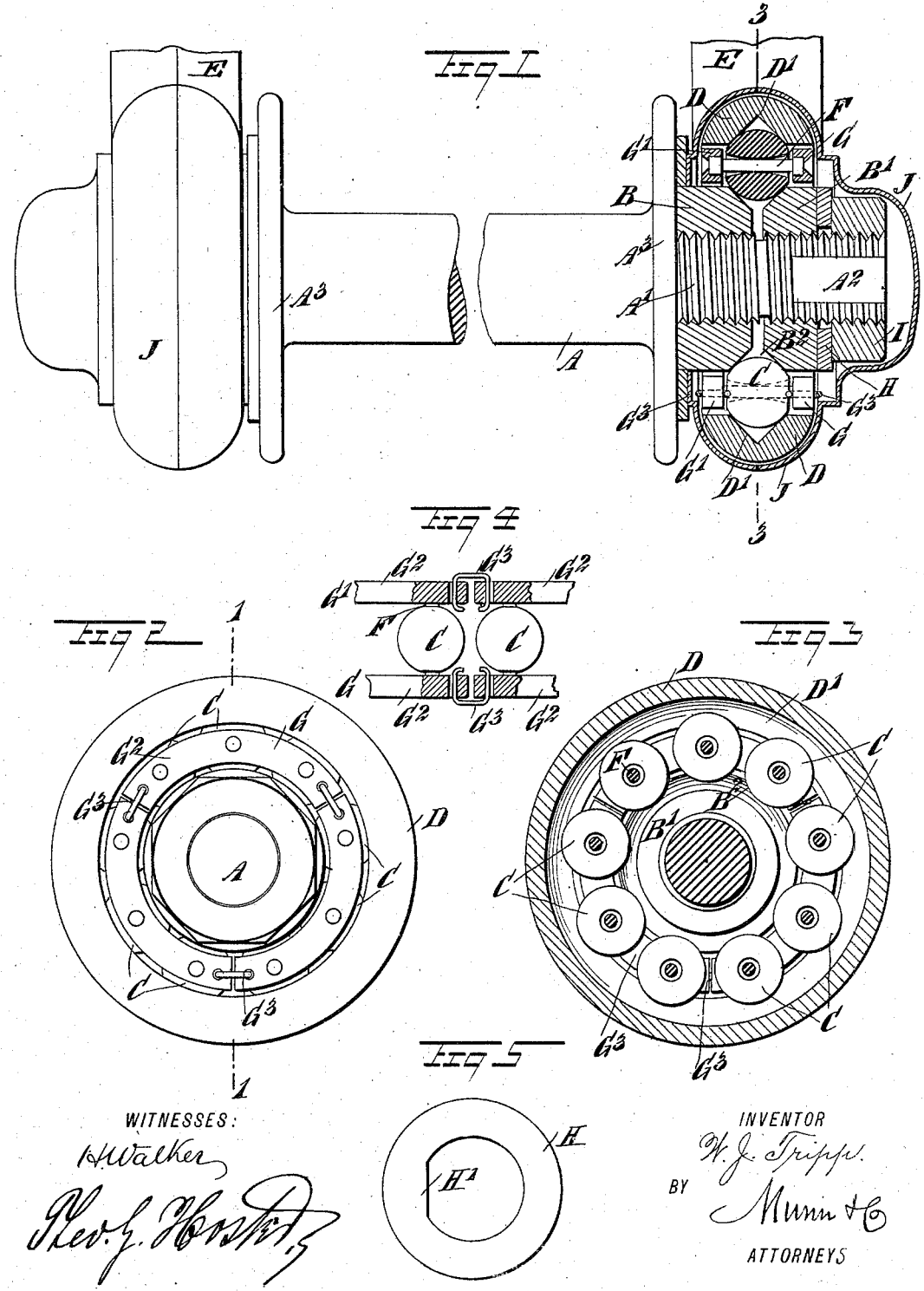
WITNESSES:
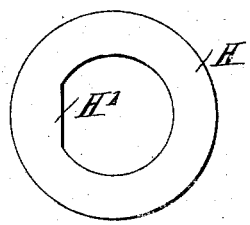
INVENTOR
W. J. Tripp
BY Munn & Co
ATTORNEYS

UNITED STATES PATENT OFFICE.

WILLIAM JAY TRIPP, OF NEW YORK, N. Y.

JOURNAL-BEARING.

SPECIFICATION forming part of Letters Patent No. 575,386, dated January 19, 1897.

Application filed December 21, 1895. Serial No. 572,892. (No model.)

*To all whom it may concern:*

Be it known that I, WILLIAM JAY TRIPP, of New York city, in the county and State of New York, have invented a new and Improved Journal-Bearing, of which the following is a full, clear, and exact description.

The object of the invention is to provide a new and improved journal-bearing which is simple and durable in construction, very effective in operation, arranged to reduce the friction of the bearing parts to a minimum, and designed for use on bicycles and other vehicles and machinery.

The invention consists, principally, of balls journaled on axles held on sectional rings, the balls being adapted to travel in angular bearing-surfaces in the fixed and revoluble parts.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1 is a side elevation of the improvement with part in section on the line 1 1 of Fig. 2. Fig. 2 is an end elevation of the same with the dust-cap removed. Fig. 3 is a cross-section of the same on the line 3 3 of Fig. 1. Fig. 4 is a plan view of the balls and sectional rings, parts of the latter being in section; and Fig. 5 is a face view of a washer.

As illustrated in Fig. 1, the hub A of a bicycle or other wheel is provided at each end with a reduced threaded portion A', on which screw the collars B B', formed at their inner adjacent ends with bevels for producing an annular V-shaped bearing-surface $B^2$, on which travel balls C, traveling with their outer portions in a correspondingly V-shaped bearing-surface D', formed on the inner surface of the ring D. The two V-shaped bearing-surfaces $B^2$ and D' are arranged opposite each other, as plainly indicated in Fig. 1, to permit each ball to make four contact-points on said bearing-surfaces. The sides or bevels of the bearing-surfaces are at right angles one to the other to form practically a square opening or path for the balls to travel in.

Each ball C is provided with an opening formed in the shape of two conic frusta having their apex ends at the center of the ball, as is plainly shown in Fig. 1, and through this opening passes an axle F, secured at its ends in rings G and G', each made in sections $G^2$, as plainly indicated in Figs. 2, 3, and 4. The adjacent ends of the sections $G^2$ of the ring G are flexibly connected with each other by a link $G^3$ to permit the sections to yield so as to allow the balls C to play and to bear at all times at four points on the annular bearing-surfaces $B^2$ and D'. Furthermore, by this construction of sectional rings the balls can be readily inserted and the rings placed in position in the journal-bearing.

The links $G^3$ are so arranged as to connect the sections $G^2$ together somewhat loosely, so that said sections will be capable of moving toward and away from each other slightly when it is necessary to adjust the cones to take up wear.

Against the outer face of the collar B' abuts a washer H, having a straight inner face H', fitting upon a correspondingly-flattened face $A^2$ on the reduced portion A' to prevent the said washer from turning. A nut I screws on the extreme outer end of the reduced portion A' against the washer H, so as to hold the collar B' in proper place relatively to the other collar B, it being understood that this arrangement will permit of nicely adjusting the distance between the two collars B and B' for the balls to travel properly on the annular bearing-surface $B^2$. A dust-cap J, preferably made in two parts, is snugly fitted over the ring D, which is arranged to turn in said dust-cap and over the outer ring G and nut I, as plainly indicated in Fig. 1, to prevent any dust from passing to the bearing. Where the device is employed in a bicycle or equivalent vehicle, the frame E will be supported upon the dust-caps J at opposite sides of the wheel-hub. The axles F are preferably enlarged at their ends and riveted to the sectional rings G G', as plainly indicated in Fig. 1.

By reference to Fig. 1 it will be seen that the rings G and G' do not come in contact with the collars B and B', or the ring D, or any other part of the bearing, so that no unnecessary rubbing of said rings takes place, and consequently friction of the moving parts is reduced to a minimum. By constructing the opening in each ball in the form of a conic frustum only an annular line-contact takes place between the balls on the axles F at the apexes of the cones, so that friction at this point is likewise reduced to a minimum.

By reference to Fig. 3 it will be seen that the balls are placed a suitable distance apart to prevent touching, so that each ball travels independent of the others, and owing to the ring-sections being flexibly connected with each other, all the balls of the bearing are active while in use.

Suitable means may be employed for securely locking the collar in place on the reduced portion A' of the hub.

When it is desired to adjust the bearing to take up wear, it is only necessary to loosen the nut I and loosen the washer H, so that the collar B' may be turned upon the axle A', whereby the balls C will be pressed into close contact with the bearing-surfaces of the collars B and B' and of the ring D. To permit this to be accomplished it is preferable to provide a space between the adjacent faces of the collars B and B', and in order to prevent the accumulation of dirt and the like between the collars from collecting upon the screw-threads on the axle A' and impeding the movement of the collars thereon, I provide the axle with an annular groove extending around it and corresponding in position to the space between the collars, into which groove any dirt or the like will settle.

From the above description it will be seen that the collars B and B' being held upon the hub which turns with the wheel the balls which are arranged between said collars and the outer ring D will be caused to move along the grooves and undue binding will be prevented since the weight supported upon the end of the hub will rest upon the ring D. In this way the greatest strain will be placed upon those balls which stand at the upper part of the bearing, so that the movement of the collars B and B' as the hub rotates will tend to move the balls downward. In cases where the weight is applied in the opposite direction the strain would be greatest on the balls standing at the lower part of the bearing, and this would cause the balls to bind in their grooves, since the movement would not be sufficient to cause the balls to rise from their lower position and pass around the upper parts of the ball-grooves. The ring D being free to revolve in the cap J, on which the frame is supported, it will be seen that said ring D can rotate within the dust-cap and act as an intermediate bearing between the axle and the frame. In this way if a ball grinds into the ring, or if a grain of sand should get in between the ball and its bearing-surfaces, the resistance offered against the turning of the balls will cause the ring D to turn in its bearing in the dust-cap until a new bearing-surface for the ball is formed.

Having thus fully described my invention, I claim as new and desire to secure by Letters Patent—

1. A journal-bearing comprising two annular bearing-surfaces made V-shaped in cross-section and arranged opposite each other to form an approximately annular path, square in cross-section, balls mounted to travel on said annular bearing-surfaces, axles on which said balls are journaled, and rings arranged parallel one to the other and made in sections flexibly connected one with the other, substantially as shown and described.

2. A journal-bearing, comprising two collars forming between them a V-shaped bearing-surface, an annular series of balls arranged to run in the bearing-surface between the collars, axles on which the balls are journaled, and rings connected to the ends of the axles and extending parallel to each other, said rings being made in sections flexibly connected together, substantially as set forth.

3. In a bearing the combination with a stationary dust-cap held stationary in the framework, of a rotative hub, two inner collars adjustable toward and from each other on the hub and having their adjacent faces inclined to form between them a V-shaped bearing-surface, an outer ring mounted to turn in the said dust-cap and having on its inner face a V-shaped bearing-surface opposite to the first-mentioned bearing-surface, and a series of balls between the said outer ring and the said inner collars and arranged to run in the said V-shaped bearing-surfaces, substantially as shown and described.

4. In a bearing, the combination of two inner collars adjustable toward and from each other and having their adjacent faces inclined to form a V-shaped bearing-surface between them, an outer ring surrounding the collars and having on its inner face a V-shaped bearing-surface corresponding in position to the first-mentioned bearing-surface, a series of balls between the outer ring and the collars and arranged to run in said bearing-surfaces, axles on which the balls are journaled, and rings connected to the opposite ends of the axles and arranged parallel with each other, said rings being made in sections loosely connected at their ends, substantially as set forth.

WILLIAM JAY TRIPP.

Witnesses:
THEO. G. HOSTER,
A. A. HOPKINS.